July 21, 1931. A. VAUPEL 1,815,600
TRANSMISSION LINE STRUCTURE
Filed May 11, 1927
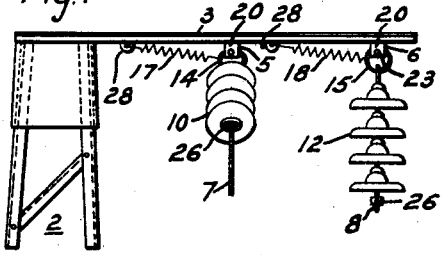
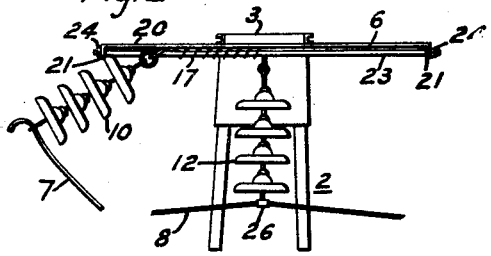
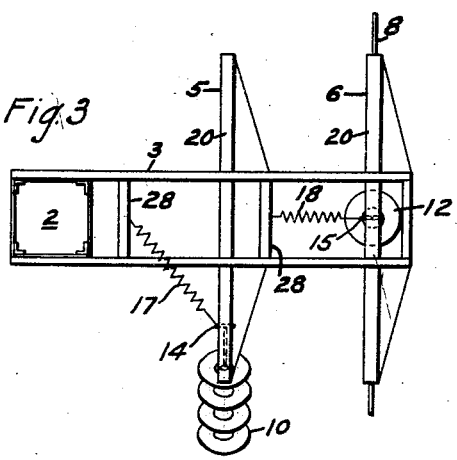
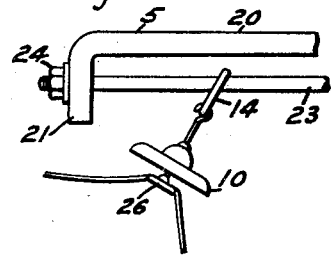
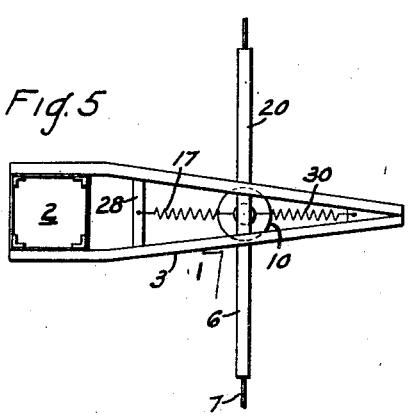
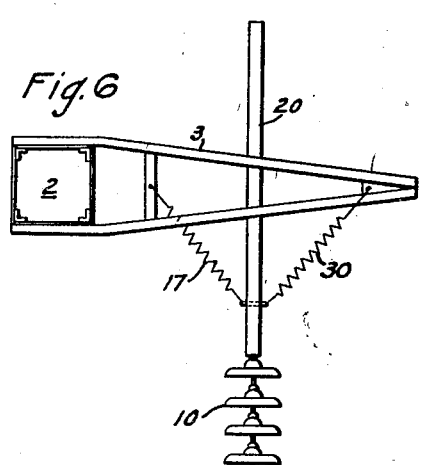
WITNESSES:
R. J. Butler
F. H. Miller
INVENTOR
Albert Vaupel
BY
Wesley G. Carr
ATTORNEY Patented July 21, 1931

1,815,600

UNITED STATES PATENT OFFICE

ALBERT VAUPEL, OF BERLIN-GRUNEWALD, GERMANY, ASSIGNOR TO WESTINGHOUSE ELECTRIC & MANUFACTURING COMPANY, A CORPORATION OF PENNSYLVANIA

TRANSMISSION LINE STRUCTURE

Application filed May 11, 1927, Serial No. 190,534, and in Germany May 12, 1926.

My invention relates to transmission line structures and particularly to structures for supporting high voltage insulators and conductors.

One object of my invention is to provide a structure of the above-indicated character that shall protect the insulator and other portions of the structure in case of rupture of the transmission line or conductor.

Another object of my invention is to provide a transmission line structure that shall permit and control limited displacing movement of an insulator relative to a main support therefor.

A further object of my invention is to provide a transmission line structure that shall be simple and durable in construction, economical to manufacture and effective in its operation.

In high voltage transmission line structures employing towers or poles from which insulators and lines or conductors are suspended, rupture of one of the conductors imposes undue stresses on the parts which sometimes results in damage or destruction thereto. This effect is caused by the fact that the parts, while sufficiently strong and flexibly related for withstanding relative movements ordinarily occurring in service, are not adapted to withstand the relatively great shocks incident to such rupture and the sudden release of relatively great weight.

It is my aim to overcome this objection and to provide a structure that shall withstand the relatively great shocks incident to breakage of a conductor, as well as to embody other features of advantage over similar structures heretofore employed.

Accordingly, in practicing my invention, I provide a transmission line structure embodying a main supporting structure, an insulator and other elements that are so constructed and related that, when breakage of a conductor occurs, movement of the insulator relative to the supporting structure is permitted. This movement is so controlled, as by limiting its extent and by gradually cushioning the displacing stresses, as to relieve all of the parts of sudden shocks and to prevent damage thereto.

Figure 1 of the accompanying drawings, is a view, taken in the direction of the line, of a transmission line structure constructed in accordance with my invention.

Fig. 2 is a side elevation, or view taken at right angles to the line, of the structure shown in Fig. 1, Fig. 3 is a top plan view of the structure shown in Figs. 1 and 2, Fig. 4 is an enlarged detail view of a portion of a structure similar to that shown in the previous figures, as viewed at the upper left hand portion of Fig. 2, and Figs. 5 and 6 are top plan views, similar to Fig. 3, of a modified form of my invention, showing the parts in different positions.

Referring to Figs. 1 to 4, inclusive, the device comprises, in general, a main supporting tower or element 2, a cross-arm or side-supporting bracket 3 projecting laterally therefrom, similar elongated elements 5 and 6 supported on the arm 3 and extending substantially parallel to the line conductors 7 and 8 respectively, rings 14 and 15 for longitudinally slidably mounting the insulators 10 and 12 on the elements 5 and 6 respectively, and springs 17 and 18 connected between the arm 3 and the rings 14 and 15, respectively.

The element 2 and the arm 3 may be of any suitable construction and are merely representations of any suitable tower or pole and cross arm structure constituting the main or primary support for the other parts.

Each of the elements 5 and 6 comprises an upper elongated portion 20 that is secured to the arm 3 and embodies downwardly projecting ends 21, between which a rod or bar 23 extends and is secured in position, as by nuts 24.

The insulators 10 and 12 may be of the series unit suspension type, as shown in Figs. 1, 2 and 3, or of the single unit suspension type, as shown in Fig. 4, and are connected between the rings 14 and 15 respectively, at the upper end thereof and clamps 26 for securing the conductors 7 and 8 thereto.

The springs 17 and 18 extend at substantially right angles to the conductors 7 and 8, and to the longitudinal axes of the insulators 10 and 12, in the normal operative position of the parts and are connected between the rings 14 and 15, respectively, and members 28, or other suitable means on the arm 3.

In operation, the parts normally assume the positions shown by the parts associated with the insulator 12. In the drawing, the parts associated with the insulator 10 are shown in the relative position assumed after rupture of the conductor 7.

In normal operative position, the insulators 10 and 12 are disposed substantially vertically opposite the center of the tower 2.

Under certain usual operating conditions, as where a deposit of snow or sleet is suddenly released from the line, the parts oscillate to a certain extent. This oscillation is compensated for, and permitted a certain degree of safe play, by slidable movement of the rings 14 and 15 on the bar 23. The springs 17 and 18 serve to control or cushion these oscillations and to return the parts to normal equilibrium or balance.

When rupture of one of the conductors occurs, as shown in connection with the conductor 7, the weight of the unbroken portion of the conductor, at one side of the insulator, causes the insulator 10 and the ring 14 to slide along the bar 23, against the action of the spring 17, to an extreme position determined by the spring, as shown, or to the end of the bar 23, as determined by one of the downwardly projecting ends 21 of the member 20.

In Figs. 4 and 5, in which corresponding parts are designated by corresponding reference characters, the construction and action of the parts are substantially the same as those above described, with the exception that another spring 30 is disposed on the opposite side of the conductor 7 between the ring 14 and the outer end of the arm 3.

By proper proportioning and redistribution of the parts, the conductor 8 and other conductors may be mounted, similarly to the mounting of the conductor 7, on the same or different arms 3.

While I have shown and described particular forms of my invention, changes may be effected therein without departing from the spirit and scope thereof, as set forth in the appended claims.

I claim as my invention:

1. A transmission line structure comprising a main supporting element, an elongated element supported thereon extending in the direction of the line, an insulator longitudinally slidably mounted on said elongated element and a spring extending laterally to the line and located between the insulator and said main supporting element.

2. In a transmission-line structure, the combination with a support, a line conductor and an insulator for supporting the conductor, of means mounted on the support with respect to which the insulator is mounted for angular movement and for movement in opposite directions, along a substantially straight-line path, the insulator being normally disposed intermediate the ends of said path.

3. In a transmission-line structure, the combination with a support, a line conductor and an insulator for supporting the conductor, of means mounted on the support with respect to which the insulator is mounted for angular movement and for movement in opposite directions along a path in the general direction of the line, and means operative between said insulator and said structure for controlling the movement of the insulator along said path in said opposite directions.

4. In a transmission-line structure, the combination with a support, a line conductor and an insulator for supporting the conductor, of means mounted on the support with respect to which the insulator is mounted for angular movement and for movement in opposite directions along a path in the general direction of the conductor, and means extending laterally to said path operatively connected between the insulator and the support for controlling the movement of the insulator along said path.

5. In a transmission-line structure, the combination with an insulator and a line conductor supported thereby, of a support for the insulator including a single substantially straight elongated element extending in the general direction of the line in both directions from an intermediate position of the support, said insulator being angularly movable relative to said element and guided thereby to move in opposite directions along a path defined by said element.

6. In a transmission-line structure, the combination with an insulator and a line conductor supported thereby, of a support for the insulator including an element defining a path extending in the general direction of the line, said insulator being angularly movable relative to said element and guided thereby to move in opposite directions along said path and spring means connected between the insulator and a stationary part of the structure for controlling the movement of the insulator along said path.

7. In a transmission-line structure, the combination with an insulator and a line conductor supported thereby, of a support for the insulator including an element defining a path extending in the general direction of the line, said insulator being angularly movable relative to said element and guided thereby to move in opposite directions along said path from a normal operating position of the insulator intermediate the ends of said path, and spring means extending laterally to said path operatively connected between the insulator and the support for controlling movement of the insulator along said path.

8. In a transmission line structure, the combination with a support, an insulator and a line conductor supported by the insulator, of a horizontal element secured to the support and extending in the general direction of the line, and means for mounting the insulator for movement along the element and pivotal movement relative thereto.

9. In a transmission-line structure, the combination with a suspension insulator and a line conductor supported thereby, of a support for the insulator including an elongated element extending in the general direction of the line, means for mounting said insulator on said element to swing relative thereto and to move in opposite directions therealong in response to movement of the conductor from a normal operating position intermediate the ends of said element, and spring means operating between said support and said mounting means for opposing the movement of the insulator in the said opposite directions.

10. In a transmission-line structure, the combination with a suspension insulator and a line conductor supported thereby, of a support for the insulator including an elongated element extending in the general direction of the line, a member interlinking said element and said insulator to permit the insulator to swing relative to the element and to move in opposite directions along the element in response to movement of the conductor, and spring means connected between the support and the interlinking member for opposing the movement of the insulator along the element in said opposite directions.

In testimony whereof, I have hereunto subscribed my name this 22nd day of April, 1927.

ALBERT VAUPEL.